United States Patent [19]

Baker

[11] 3,924,318

[45] Dec. 9, 1975

[54] SAW FOR PRECISION CUTTING TOOL

[76] Inventor: John W. Baker, 4 Wachusetts Drive, West Acton, Mass. 01720

[22] Filed: Apr. 26, 1974

[21] Appl. No.: 464,475

Related U.S. Application Data

[62] Division of Ser. No. 273,385, July 20, 1972, Pat. No. 3,820,233.

[52] U.S. Cl. .................. 29/567; 29/90 R; 29/95 C; 83/835; 83/851; 144/218; 144/222; 144/231; 144/240

[51] Int. Cl.² ........................................ B26D 1/28

[58] Field of Search ......... 29/95 B, 103, 95.1, 95 C, 29/90 R, 567; 83/835, 840, 849, 850, 854, 855, 851, 846, 857; 144/218, 230, 222, 231, 240

[56] References Cited
UNITED STATES PATENTS

| | | | |
|---|---|---|---|
| 2,720,229 | 10/1955 | Drake | 29/95 X |
| 2,965,143 | 12/1960 | Feldmann et al. | 29/95.4 |
| 3,048,207 | 8/1962 | Ferrari | 83/855 |
| 3,576,200 | 4/1971 | Elmes | 29/95 C X |
| 3,792,524 | 2/1974 | Pomernacki | 29/567 |

Primary Examiner—Frank T. Yost
Assistant Examiner—W. D. Bray
Attorney, Agent, or Firm—Robert A. Cesari; John F. McKenna; Andrew F. Kehoe

[57] ABSTRACT

Apparatus for precision cutting of sheet material (e.g. non-ferrous metals such as aluminum, brass, asbestos board, or the like), comprising a work-support table, displacement-sensing means mounted along two adjacent sides of said support table and a novel quick-clamping means for holding a workpiece against said table. The quick-clamping means has an elongate clamp bar along each side of the cutting tool, these elongate bars comprising biased means therealong for compensating for differences in thickness along the length of said workpiece.

6 Claims, 9 Drawing Figures

SAW FOR PRECISION CUTTING TOOL

This is a co-pending divisional application divided out of U.S. patent application Ser. No. 273,385 filed on July 20, 1972 now U.S. Pat. No. 3,820,233.

BACKGROUND OF THE INVENTION

This invention relates to apparatus useful for rapidly cutting sheet material to a high precision tolerance by utilizing dimension-monitoring sensors associated with a work table and a quickly-actuatable clamp means for holding the workpiece against the table firmly enough, and with sufficient speed and convenience, to make the aforesaid precision attainable at practical production rates.

There has long been a problem in achieving cutting of non-ferrous sheet material to precision tolerances. By precision tolerances is meant a tolerance of plus-or-minus 0.005 inch but especially of plus-or-minus 0.002 inch or better. Such tolerances are, of course, known to be obtainable in machining such non-ferrous materials as aluminum sheet, asbestos board, and the like. Nevertheless, the apparatus heretofore available for such precision cutting has not been feasible for use in many cutting jobs because of the ineffective use of conventional clamp means. The clamp means heretofore utilized have either allowed slippage which rendered the cutting process imprecise or have taken so much time to operate that any economic advantage of obtaining high precision cutting was restricted to processing a relatively high-priced work product. Consequently jobbers in the cutting of non-ferrous materials have not been able to deliver a high-precision product at a desirably low price. This general problem is particularly evident with respect to relatively small orders of high-precision sheet material.

Heretofore unrelated art concerns the finish of a saw-cut edge and how quickly that finish is likely to deteriorate with prolonged use of prior art saw teeth. In general, applicants ability to produce precision-cut non-ferrous articles will be understood to allow a customer to avoid any post-cutting machining operations on these articles. The precision-machined part will be ready for use as delivered. In many situations, however, the part will be subjected to a surface treatment, say anodizing, or the like and will require a good finish, say a finish of 63 root mean square (rms) or below. Presently-available saws which will provide this finish initially will provide a deteriorating result with time; that is after a day's operation the finish of the cut edge may be as high as 100 rms or more. This obviously presents a problem to manufacturers who wish to produce an excellently finished, precision-cut workpiece without excessive blade-changing or post-cutting buffing steps.

SUMMARY OF THE INVENTION

Therefore it is an object of the invention to provide improved apparatus for precision cutting of sheet material.

Another object of the invention is to provide apparatus comprising novel clamp means for holding a workpiece being subjected to a precise cutting operation.

Further objects of the invention are to provide a novel clamp means which is readily clamped and unclamped, to provide a novel clamp means which engages snugly the workpiece even through the workpiece itself comprises dimensional irregularities, and to provide a clamp means which successfully clamps the workpiece against movement induced or allowed by the cutting of the workpiece.

Still another object of the invention is to provide a saw which complements the high precision cutting operation by allowing the operation to produce articles having a superior finish on cut edges thereof.

A further object of the invention is to provide improved means for advancing the workpiece to be cut.

Another object of the invention is to provide a novel and relatively inexpensive means for accurately advancing the workpiece into the cutting path of the saw.

Other objects of the invention will be obvious to those skilled in the art on reading the instant application.

The invention relates to a cutting apparatus having a work table, two adjacent perimeters of which are bordered by workpiece guide rails equipped with means for sensing the proximity of the workpiece to the guide rail at a plurality of positions therealong and, consequently, allowing a quick determination of the squareness (or any predetermined angle) of a piece to be cut and also allowing a means for detecting any drift of positioning during the cutting operation. A workpiece clamp means comprising elongate clamp members closely spaced, one along each side of a cutting means and adapted to clamp the workpiece against the work table, is an improtant feature of the invention.

In the most favorable forms of the invention, the clamp bars comprise biasing means associated therewith whereby gaps which would ordinarily prevent snug, clamping contact with the clamp bar are bridged by the biasing means. Thus the biasing means is advantageously an "active" means in that it depends from, and contacts the workpiece below, the normal clamping surface of the clamp bar. Moreover, in the most favorable embodiments of the invention, a plurality of biasing means are arranged, not only along the direction of the cut for a distance which is substantially coextensive with the travel path of the cutting means, but also at right angles to the cut, i.e. on both sides of the travel path of the cutting means.

The actuation means for the clamp should be adapted to provide a variable clearance between work table and the clamp. This is best achieved by mounting the clamp for vertical movement and moving it by hydraulic means, mounted beneath the work table, and through a pair of ball bushings mounted proximate each end of the clamp. The clamp actuator is a constant pressure device.

Non ferrous sheet material can be finished to excellent tolerance on the apparatus of the invention. Indeed, even where tolerances of plus-or-minus 0.002 inch are required, say on a nominal ⅜-inch thick aluminum sheet, the apparatus can quickly and efficiently be used to turn out the sheet.

In order to give the cut edge of such a sheet a more "finished" appearance, applicant has also constructed a saw means useful with the apparatus of the invention. In this improvement, finishing teeth comprising narrow flat bands, substantially vertical (i.e. radial) and converging from the front face to the rear face of the tooth, have been found to yield a finish along a cut edge which can be used suitably in a wide variety of applications without further finishing operations. The finish attainable with this saw is markedly superior both with respect to the finish initially obtainable and with respect to the rate of deterioration of the finish of the cut edge of the workpiece with use of the saw. For example, the cut edge will have a finish of as low as 16 rms initially and is usually in the 30 rms range for non-ferrous metals such as aluminum and its common alloys. More importantly, an initially attained finish of, say 24 rms will not deteriorate substantially during the same period when use of a similar saw, not comprising the finishing tooth modification disclosed herein, would result in a deterioration or from 63 rms to about 120 rms.

Without being bound by the hypothesis, it is believed by the inventor that the advantage of his saw is the use of a friction inducing surface which is substantially parallel along the radius of the saw blade to the workpiece edge being cut. The work created by this frictional contact of the surface is believed to have a substantial effect on smoothing the surface.

As will be further explained below, the high tolerance work achieved by the apparatus of the invention requires an even advance of the workpiece to the desired position along the linear cutting path of the saw blade. This advance has been achieved by mounting an adjustable rail for movement on two ball screw advance devices, wherein the ball screws are selected to have a close relative tolerance one to the other. Although it has been the custom in the mechanical arts to use screws machined to a particular tolerance in such situations, the inventor has discovered that standard ball bearing screws can be utilized at a great savings in cost. This is achieved by making both advance ball screws by cutting them from a single screw stock, preferable discarding several inches from the end of each such single screw. The resulting pair of screws will have very high relative tolerance despite the fact the manufacturer's absolute tolerance would forbid the indiscriminate use of any two separate commercially-obtained screws. Thus instead of using ground ball screws with tolerances such as 0.0005 inches per foot, applicant can use a thread rolled ball screw with a tolerance of 0.001 inch per inch. This procedure saves several hundreds of dollars in manufacturing each machine.

ILLUSTRATIVE EXAMPLE OF THE INVENTION

In this application and accompanying drawings there is shown and described a preferred embodiment of the invention and suggest various alternatives and modifications thereof, but is is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

Figure 6:
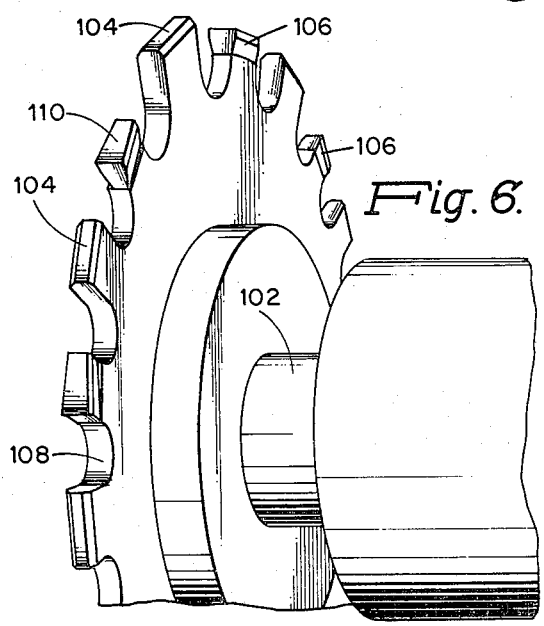
Figure 7:
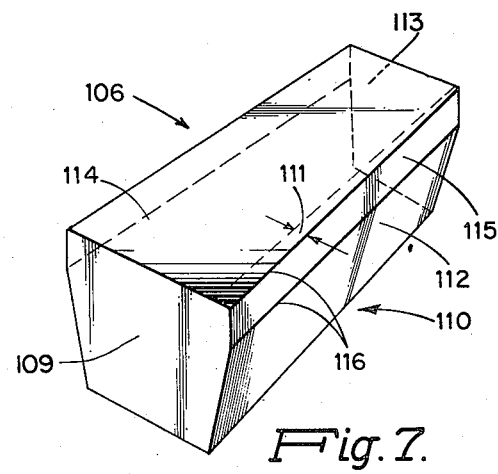

FIGS. 6 and 7 diagrammatically illustrate a novel finishing saw useful with the apparatus of the invention.

Figure 8:
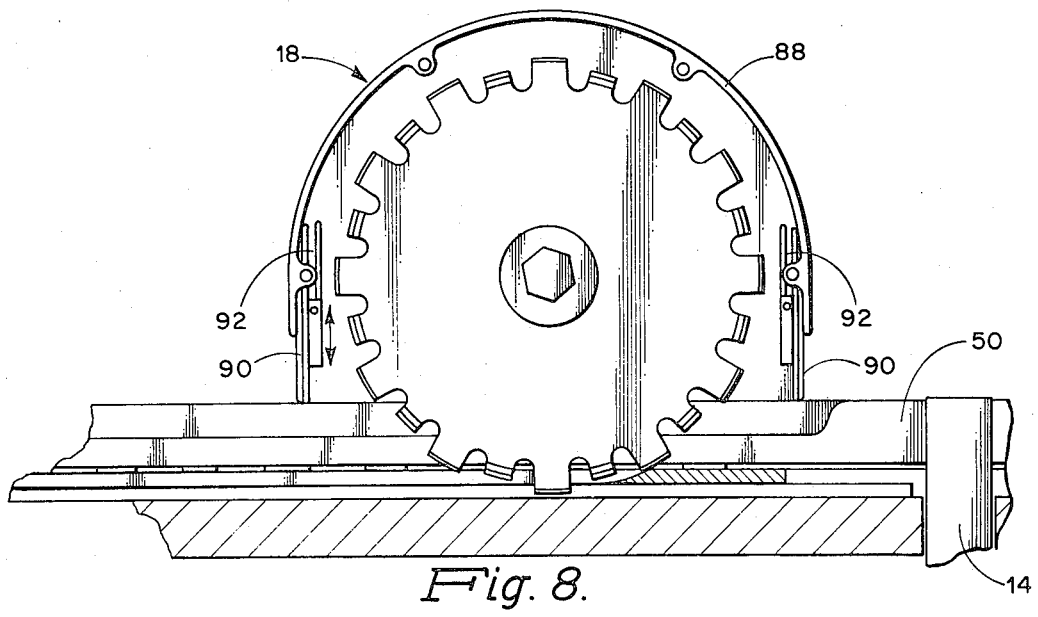

FIG. 8 shows the construction of a saw-guard and how it co-operates with the movement of vertically-adjustable clamping means.

Figure 1:
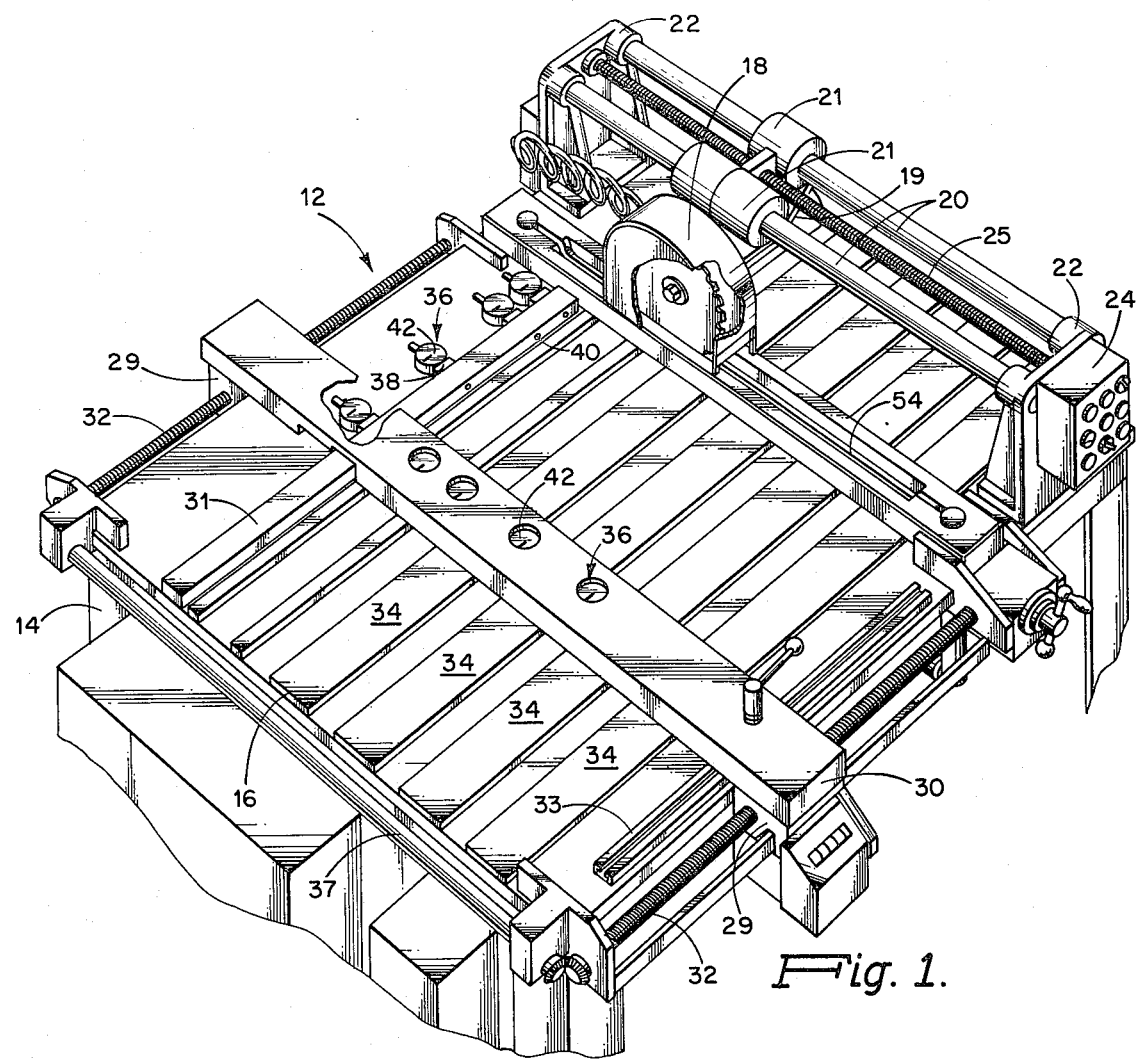
FIG. 1 is a perspective view of a cutting machine constructed according to the invention.

Referring to FIG. 1, it is seen that cutting machine 12 is mounted on frame 14 and comprises a work table 16 and a hood-enclosed saw 18 adapted for movement with saw drive motor 19 across work table 16 on ball bushings 21 along support rods 20. Rods 20 are typically constructed of steel 2 inches in diameter and supported on brackets 22 attached to frame 14. Also attached to frame 14 is an electric control box 24. Progress of saw 18 across the work table is dependent on the speed at which feed screw 25 is turned by a variable drive feed screw motor not shown on the drawings.

Figure 4:
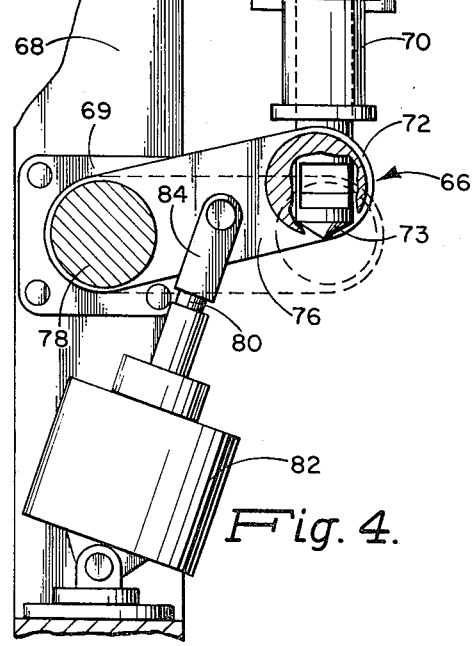
FIG. 4 is a view of the work table and clamp-actuating mechanism as viewed along the line 4—4 of FIG. 3.

Mounted proximate work table 16 are two workpiece positioning rails mounted at a right angle to one another. Adjustable positioning rail 30 is mounted on ball screws 32 by means of brackets 39 and in guide member 33 for controlled movement of rail 30 against a workpiece (not shown on the drawing, but understood by those skilled in the art to rest on slats 34 and slats 35 of table 16. See FIG. 4 for the position of Slats 35.). Stationary positioning rail 31 is mounted along one edge of table 16 at a right angle to rail 30. Ball screws 32 are interconnected by a common gear 37.

Displacement sensing means 36 are positioned along the workpiece-contacting edges of each of rails 30 and 31. Means 36 comprises a plurality of feeler gauges 38. Gauges 38 comprise a mechanical sensing probe means 40 and a dial 42. Probes 40 are positioned to engage the edge of a workpiece when it is flat against the rails 30 and 31. Sensing probes 40 conveniently extend about 0.020 inches from rails 30 and 31 when in normal position. The dial indicator is conveniently calibrated to a 0.020 inch scale per revolution.

Figure 5A:
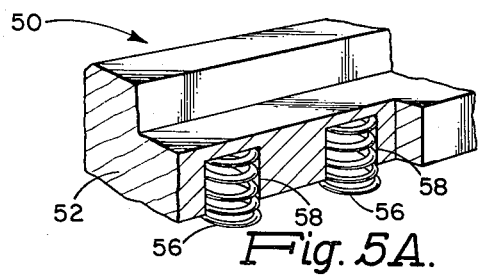
FIG. 5A is a fragment of the clamp bar of FIG. 5 showing more detail thereof.
Figure 5:
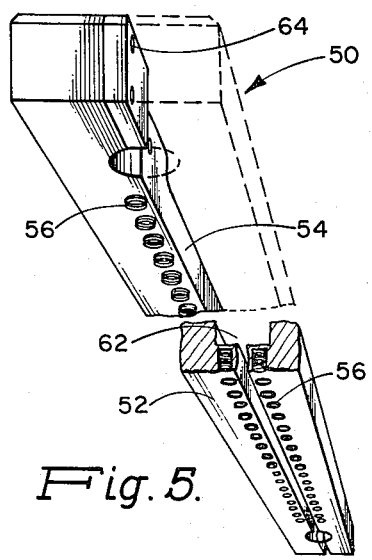
FIG. 5 is a perspective view of a clamp bar useful with the apparatus of the invention showing the biasing means thereof.

A clamp bar 50, best seen in FIGS. 5 and 5A, extends across table 16. Clamp bar 50 comprises two elongate clamping members 52, one on each side of the path of travel 54 of the cutting means, saw 18. Each clamp bar 52 comprises a plurality of independent biasing means, i.e. springs 56, mounted in receptacles 58 within clamp bars 52. Springs 56 are affixed with epoxy adhesive 58 at one end thereof.

Figure 3:
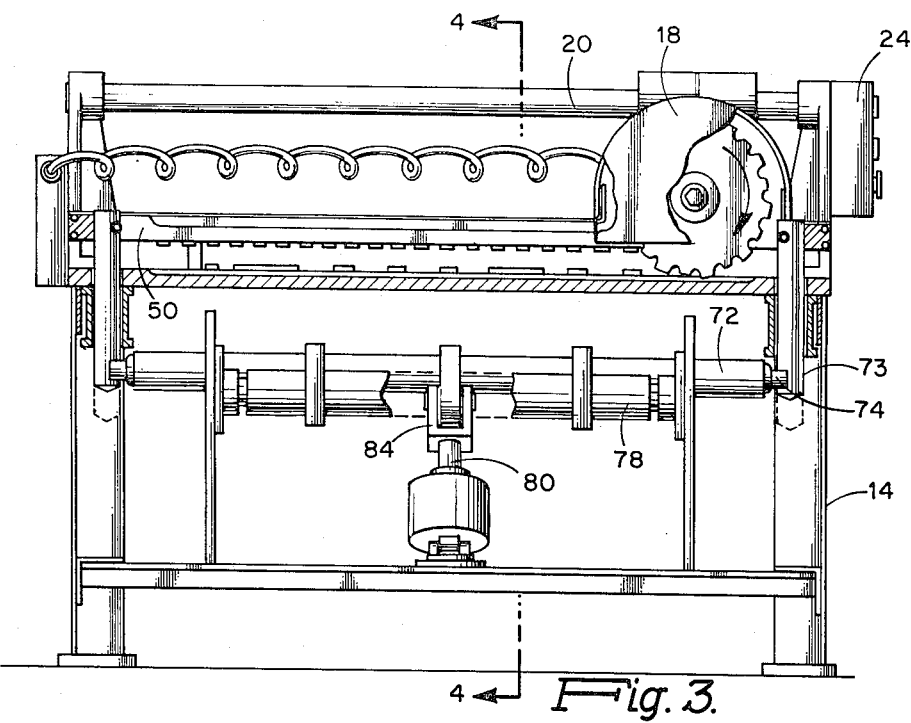
FIG. 3 is a side view of the work table and a clamp-actuating device as viewed along the line 3—3 of FIG. 2.

Each clamping member 52 comprises an elongate recess 62 which provides clearance for saw guide means as it travels along clamp bar 52. The clamping member is preferably unitary, that is integrated into a single structural unit as is shown in FIG. 5. One spring biasing means suitable for many purposes would be a steel spring constructed of 0.094 wire, 1 inch long, 0.5 inch in diameter and exerting about 15 pounds force when compressed about 0.050 inches by clamping means shown in FIGS. 3 and 4.

Clamping member 52 is actuated for vertical clamping movement frame 14 by means of bracket 68 and a flanged cartridge 69. Clamp-actuation assembly 66 comprises two ball bushings 70 which are operably connected between clamp bar 50 and ball bushing shaft 72 via a vertically slideable ball bushing post member 73 which is snugly clamped between members 52.

Shaft 72 comprises cam rollers 74 at either end thereof; these fitting into a slot in member 73 so that they may turn freely. Shaft 72 is, in turn, connected via a lever arm member 76 to a pivot shaft 78. Lever arm 76 comprises, is welded to operating shaft 72 and pivot shaft 78 respectively. Shaft 78 is pivotally mounted in collars 68. Force is applied to arms 76 via shaft piston rod 80 of hydraulic cylinder 82 acting through clevis-type connector 84. Cylinder 82 is pivotally mounted at pivot 86.

In FIG. 8 is illustrated schematically one means whereby a saw housing 88 is made to accomodate the movement of clamping member 50. Two moveable side shields 90 are held in slots 92 and move freely up and down therein in response to the vertical movement of member 50.

FIGS. 6 and 7 illustrate, somewhat schematically, cutting means which is particularly useful with the apparatus of the invention. In FIG. 6, a rotary saw 100 is mounted for rotation by motor 19 on the shaft 102 of cutting machine 12. The saw is carbide tipped and of a generally conventional design, i.e. it has roughing teeth 104 and finishing teeth 106 alternately arranged along the periphery thereof. Only a few teeth are shown in FIG. 6, this being sufficient to illustrate this aspect of the invention. Roughing teeth 104 rise somewhat higher from the outer circumference 108 of the circular portion of saw 100. These roughing teeth 104 are of conventional design.

The particular improvement of the inventor is related to the use in conjunction with said roughing teeth, of novel finishing teeth. As indicated in FIG. 7, finishing tooth 106 comprises a generally tapered member 110 a front face 109, and a rear face 113, the taper being such that angles 111 are about 3° to 5°, although they may be from 1° to 10° depending upon the relative properties of the saw and the material to be cut. Along the top of each lateral faces 112 proximate top face 114 is a substantially vertical bond, a beveled face 115, defined by two edges 116. These faces 115 run the full length of finishing tooth 106, i.e. about 0.35 inches, and are about 0.030 inches in width. The faces are advantageously between 0.1 and 0.01 inches in width. These dimensions are particularly suited for cutting of such non-ferrous metals as alluminum.

In operation, of the apparatus, a workpiece is placed on worktable 16 and brought snugly against rails 30 and 31. This, of course, assumes a generally rectangular workpiece since the angle between rails 30 and 31 is a 90° angle in the illustrative example of the drawings. Assuming all indicators are properly calibrated and the angle of the workpiece is perfectly square, all indicator dials will read the same. However, to the extent that the workpiece is out of square or has other defects like sizeable burs, they immediately become evident. Thus the piece can be "squared" before proceeding further or, if a single side is imperfect, the fault side can be selected to be the side removed during the cutting operation.

Figure 2:
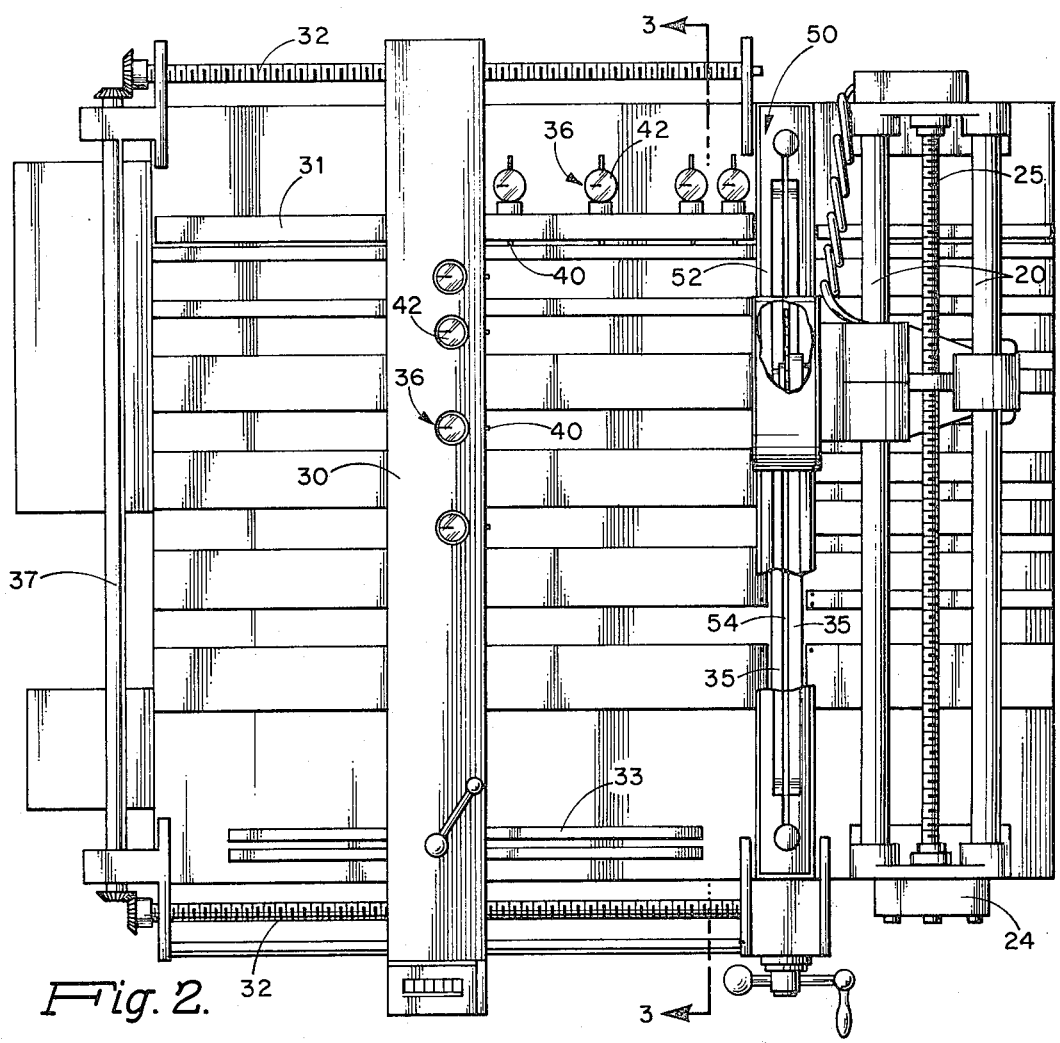
FIG. 2 is a fragmentary plan view of a machine similar to that shown in FIG. 1 and showing the work table and saw-travel path.

Once the operator is assured the workpiece is in condition to proceed, and in the proper position relative to saw path 54, he causes cylinder 82 to retract about 2 inches and thereby causes arm 76 to pivot down. Thereupon clamp bar 50 bears down on the workpiece on each side of travel path 54. The workpiece is supported on slats 35, the saw travelling between such slats as seen in FIG. 2.

Springs 56 are typically placed about 1-inch apart along, say, a 20-inch length of the clamp bar. If just compressed to the edge of their housings, these springs will exert a minimum of about 600 pounds of pressure. Normally, however, the clamping pressure will exceed this considerably and the only spings that will be effective in the clamping action will be those which protrude outside of receptacles 58 to engage a surface which, for some reason, does not contact a main bearing surface of clamp bar 50.

When the workpiece is properly clamped, the sawing can be carried out, and the proper positioning of the workpiece can be visually monitored as the sawing progresses.

Among the modifications which can be made in the illustrated apparatus is the substitution of various elongate biasing means for one or both of the illustrated series of springs. One desirable substitute would be an elongate strip of elastomeric material, e.g. a distortable synthetic rubber such as chloroprene, a nitrile rubber, or an elastomeric silicone resin material. Such a strip would have the advantage of being in continual contact along the portion of the workpiece being processed. Another useful biasing means is a fluid containing balloon which could be expanded by the use of either water or gas to achieve the desirable clamp pressure on portions of the workpiece that do not fit snugly against the main bearing surface of the clamp bar.

It will be understood that a single clamp bar can comprise one or more such biasing means.

It is also to be understood that the following claims are intended to cover all of the generic and specific features of the invention herein described, and all statements of the scope of the invention which, as a matter of language, might be said to fall therebetween.

I claim:

1. In a saw of the type having roughing teeth and finishing teeth arranged to form a cutting edge, each said finishing tooth having a front face, a rear face and side faces and being generally tapered downwardly from near the top to the bottom of said finishing teeth, the improvement wherein, along the top of each said side face of said finishing teeth, there is a relatively narrow band, the narrow bands being vertical and converging from the front face to the back face:

2. The saw of claim 1, wherein said bands are from about 0.1 to 0.01 inches wide and extends less than about one-third the way down said side faces.

3. The saw of claim 1 wherein each of said bands converge from said front face to said back face, at an angle of from 1° to 10°.

4. The saw of claim 3 wherein each of said bands converge from said front face to said back face, at an angle of from 2° to 5°.

5. The saw of claim 2 wherein each of said bands converge from said front face to said back face, at an angle of from 1° to 10°.

6. The saw of claim 5 wherein each of said bands converge from said front face to said back face, at an angle of from 2° to 5°.

* * * * *